US012453689B2

United States Patent
Bai et al.

(10) Patent No.: US 12,453,689 B2
(45) Date of Patent: Oct. 28, 2025

(54) SHAMPOO FORMULATION WITH ENHANCED SILICONE DEPOSITION

(71) Applicants: Union Carbide Corporation, Seadrift, TX (US); Rohm and Haas Company, Collegeville, PA (US)

(72) Inventors: Lu Bai, Novi, MI (US); Emmett M. Partain, III, Bound Brook, NJ (US); Lyndsay M. Leal, Spring City, PA (US); Daniel S. Miller, Phoenixville, PA (US); Michaeleen Pacholski, Collegeville, PA (US); Jennifer P. Todd, Willow Grove, PA (US)

(73) Assignees: Rohm and Haas Company, Collegeville, PA (US); Union Carbide Corporation, Seadrift, TX (US)

( * ) Notice: Subject to any disclaimer, the term of this patent is extended or adjusted under 35 U.S.C. 154(b) by 277 days.

(21) Appl. No.: 18/260,055

(22) PCT Filed: Mar. 9, 2022

(86) PCT No.: PCT/US2022/019465
§ 371 (c)(1),
(2) Date: Jun. 30, 2023

(87) PCT Pub. No.: WO2022/203862
PCT Pub. Date: Sep. 29, 2022

(65) Prior Publication Data
US 2024/0082137 A1   Mar. 14, 2024

Related U.S. Application Data

(60) Provisional application No. 63/164,053, filed on Mar. 22, 2021.

(51) Int. Cl.
| | | |
|---|---|---|
| *A61K 8/46* | (2006.01) | |
| *A61K 8/73* | (2006.01) | |
| *A61K 8/891* | (2006.01) | |
| *A61Q 5/02* | (2006.01) | |
| *A61Q 5/12* | (2006.01) | |

(52) U.S. Cl.
CPC ............ *A61K 8/73* (2013.01); *A61K 8/463* (2013.01); *A61K 8/891* (2013.01); *A61Q 5/02* (2013.01); *A61Q 5/12* (2013.01)

(58) Field of Classification Search
None
See application file for complete search history.

(56) References Cited

U.S. PATENT DOCUMENTS

| | | |
|---|---|---|
| 4,411,891 A | 10/1983 | Mizutani et al. |
| 8,518,387 B2 | 8/2013 | Drovetskaya et al. |
| 10,633,683 B2 | 4/2020 | Paullin et al. |
| (Continued) | | |

FOREIGN PATENT DOCUMENTS

| | | |
|---|---|---|
| CN | 106511133 | 3/2017 |
| DE | 10018158 | 10/2001 |
| (Continued) | | |

OTHER PUBLICATIONS

Mintel, "Chinese Medicine Anti-Dandruff & Olive Moisturising Shampoo", Bawang Cosmetic, 2015, Database GNPD, CN.

(Continued)

*Primary Examiner* — Brian Gulledge
(74) *Attorney, Agent, or Firm* — Thomas S. Deibert

(57) ABSTRACT

A shampoo formulation is provided, comprising: dermatologically acceptable vehicle; dermatologically acceptable silicone; sodium lauryl ether surfactant, wherein the sodium lauryl ether surfactant is selected from sodium lauryl ether sulfate having an average two —(OCH$_2$CH$_2$)— groups per molecule, sodium lauryl ether sulfate having an average three —(OCH$_2$CH$_2$)— groups per molecule and mixtures thereof; deposition aid polymer, wherein the deposition aid polymer is cationic dextran polymer, comprising dextran polymer functionalized with quaternary ammonium groups; wherein the dextran polymer has weight average molecular weight of 50,000 to 3,000,000 Daltons; wherein quaternary ammonium groups are selected from quaternary ammonium moieties of formula (A) bound to pendent oxygen on dextran polymer $$\substack{\xi \\ \xi} \text{—O—X—} \overset{\overset{R^2}{|}}{\underset{\underset{R^2}{|}}{N^\oplus}} \text{—R}^3 \quad (A)$$

wherein $$\substack{\xi \\ \xi} \text{—O}$$

is pendent oxygen on dextran polymer; wherein X is divalent linking group bonding quaternary ammonium moiety to pendent oxygen on dextran polymer; wherein each R$^2$ is independently selected from C$_{1-4}$ alkyl group; and wherein R$^3$ is linear or branched C$_{8-16}$ alkyl group.

10 Claims, No Drawings

(56) References Cited

U.S. PATENT DOCUMENTS

| | | | |
|---|---|---|---|
| 10,716,748 B2 | 7/2020 | Gonzalez et al. | |
| 10,874,598 B2 | 12/2020 | Yang et al. | |
| 2008/0003192 A1 | 1/2008 | Modi | |
| 2009/0176679 A1* | 7/2009 | McKee | C08G 73/1092 |
| | | | 510/276 |
| 2010/0093584 A1 | 4/2010 | Brand et al. | |
| 2010/0247472 A1 | 9/2010 | Sau | |
| 2011/0177017 A1 | 7/2011 | Coffindaffer et al. | |
| 2012/0021025 A1* | 1/2012 | Bendejacq | A61Q 5/02 |
| | | | 424/70.13 |
| 2015/0098920 A1 | 4/2015 | Stella et al. | |
| 2015/0203598 A1 | 7/2015 | Landschutze et al. | |
| 2018/0237816 A1 | 8/2018 | Paullin et al. | |

FOREIGN PATENT DOCUMENTS

| | | |
|---|---|---|
| EP | 2119428 | 11/2009 |
| EP | 3486356 | 5/2019 |
| JP | 10279449 | 10/1998 |
| JP | 11322555 | 11/1999 |
| JP | 2000159642 | 6/2000 |
| JP | 2000319139 | 11/2000 |
| JP | 3720964 | 11/2005 |
| JP | 2009062281 | 3/2009 |
| JP | 4712222 | 6/2011 |
| WO | 2010009938 | 1/2010 |
| WO | 2010089228 | 8/2010 |
| WO | 2014047099 | 3/2014 |
| WO | 2017174678 | 10/2017 |
| WO | 2021194804 | 9/2021 |
| WO | 2021194805 | 9/2021 |
| WO | 2021194807 | 9/2021 |
| WO | 2021194809 | 9/2021 |

OTHER PUBLICATIONS

Mintel, "Refresh Mint Cool Body Wash Gel", Bawang Cosmetic, 2015, Database GNPD, CN.

Sibilia "A Guide to Materials Characterization and Chemical Analysis", VCH, 1988, pp. 81-84.

Stanciu "Influence of dextran hydrogel characteristics on adsorption capacity for anionic dyes", Carbohydrate Polymers, 2018, pp. 75-83, vol. 199, Applied Science Publishers Ltd, Barking, GB.

Yau "Modern Size Exclusion Chromatography", Wiley-Interscience, 1979.

\* cited by examiner

SHAMPOO FORMULATION WITH ENHANCED SILICONE DEPOSITION

The present invention relates to a shampoo formulation. In particular, the present invention relates to a shampoo formulation containing: a dermatologically acceptable vehicle; a dermatologically acceptable silicone; a sodium lauryl ether surfactant, wherein the sodium lauryl ether surfactant is selected from the group consisting of a sodium lauryl ether sulfate having an average of two —(OCH$_2$CH$_2$)— groups per molecule, a sodium lauryl ether sulfate having an average of three —(OCH$_2$CH$_2$)— groups per molecule and mixtures thereof; a deposition aid polymer, wherein the deposition aid polymer is a cationic dextran polymer, comprising a dextran polymer functionalized with quaternary ammonium groups; wherein the dextran polymer has a weight average molecular weight of 50,000 to 3,000,000 Daltons; wherein the quaternary ammonium groups are selected from the group consisting of quaternary ammonium moieties of formula (A) bound to a pendent oxygen on the dextran polymer

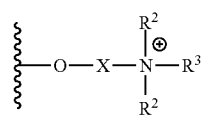

(A)

wherein

is a pendent oxygen on the dextran polymer; wherein X is a divalent linking group bonding the quaternary ammonium moiety to the pendent oxygen on the dextran polymer; wherein each R$^2$ is independently selected from the group consisting of a C$_{1-4}$ alkyl group; and wherein R$^3$ is a linear or branched C$_{8-16}$ alkyl group.

Hair cleansing has become a ubiquitous component of personal hygiene. Cleansing of the hair facilitates the removal of dirt, germs and other things that are perceived as harmful to the hair or the individual. Cleansing formulations typically include a surfactant to promote the removal of materials deposited on the hair. Unfortunately, the cleansing formulations remove both undesirable and desirable materials from hair. For example, cleansing formulations frequently undesirably remove oils from hair; oils operate to protect hair from loss of moisture. Removal of too much oil from hair may leave the hair vulnerable to becoming dry and damaged. One solution to this concern is the selection of mild surfactants. Another approach is to incorporate additives that help replace the oils removed through deposition; however, this approach has proven difficult in implementation, particularly in rinse off applications.

In U.S. Pat. No. 7,067,499, Erazo-Majewicz, et al. disclose personal care and household care product composition comprising at least one cationic polygalactomannan or a derivative of cationic polygalactomannans wherein the derivative moiety on the cationic derivatized polygalactomannan is selected from the group consisting of alkyl, hydroxyalkyl, alkylhydroxyalkyl, and carboxymethyl wherein the alkyl has a carbon chain containing from 1 to 22 carbons and the hydroxyalkyl is selected from the group consisting of hydroxyethyl, hydroxypropyl, and hydroxybutyl, wherein the at least one cationic polygalactomannan or derivative of cationic polygalactomannans have a mean average molecular weight (Mw) having a lower limit of 5,000 and an upper limit of 200,000 and having a light transmittance in a 10% aqueous solution of greater than 80% at a light wavelength of 600 nm and a protein content of less than 1.0% by weight of polysaccharide, and aldehyde functionality content of at least 0.01 meq/gram.

While conventionally used deposition aids such as soluble cationic modified celluloses (e.g., polyquaternium-10), guar hydroxypropyltrimonium chloride and other cationic polymers (e.g., polyquaternium-6, polyquaternium-7) provide a certain level of deposition in personal care cleansers; they nevertheless exhibit low efficiency necessitating a relatively high incorporation of the active into the personal care cleanser formulation to facilitate desired results. Such high active (e.g., silicone) levels, however, detrimentally effect the foam/lathery in use consumer feel of the formulation and cost.

Accordingly, there remains a need for deposition aids that facilitate enhanced efficiency of silicone deposition from shampoo formulations. There is also a continuing need for new deposition aids having an increased natural origin index (ISO16128) when compared with conventional deposition aids.

The present invention provides a shampoo formulation, comprising: a dermatologically acceptable vehicle; a dermatologically acceptable silicone; a sodium lauryl ether surfactant, wherein the sodium lauryl ether surfactant is selected from the group consisting of a sodium lauryl ether sulfate having an average of two —(OCH$_2$CH$_2$)— groups per molecule, a sodium lauryl ether sulfate having an average of three —(OCH$_2$CH$_2$)— groups per molecule and mixtures thereof; a deposition aid polymer, wherein the deposition aid polymer is a cationic dextran polymer, comprising a dextran polymer functionalized with quaternary ammonium groups; wherein the dextran polymer has a weight average molecular weight of 50,000 to 3,000,000 Daltons; wherein the quaternary ammonium groups are selected from the group consisting of quaternary ammonium moieties of formula (A) bound to a pendent oxygen on the dextran polymer

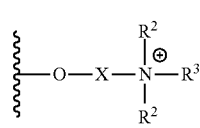

(A)

wherein

is a pendent oxygen on the dextran polymer; wherein X is a divalent linking group bonding the quaternary ammonium moiety to the pendent oxygen on the dextran polymer; wherein each R$^2$ is independently selected from the group consisting of a C$_{1-4}$ alkyl group; wherein R$^3$ is a linear or branched C$_{8-16}$ alkyl group.

The present invention provides a method of depositing silicone on to mammalian hair, comprising: selecting a shampoo formulation of the present invention; and applying the shampoo formulation to mammalian hair.

DETAILED DESCRIPTION

We have surprisingly found that silicone deposition from shampoo formulations can be enhanced through incorporation of a deposition aid polymer, wherein the deposition aid polymer is a cationic dextran polymer, comprising a dextran polymer functionalized with quaternary ammonium groups; wherein the dextran polymer has a weight average molecular weight of 50,000 to 3,000,000 Daltons and wherein the quaternary ammonium groups are selected from the group consisting of quaternary ammonium moieties of formula (A) bound to a pendent oxygen on the dextran polymer

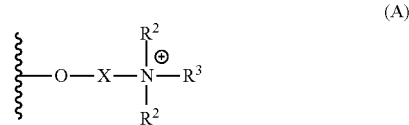

(A)

wherein

is a pendent oxygen on the dextran polymer; wherein X is a divalent linking group bonding the quaternary ammonium moiety to the pendent oxygen on the dextran polymer; wherein each $R^2$ is independently selected from the group consisting of a $C_{1-4}$ alkyl group; wherein $R^3$ is a linear or branched $C_8$ alkyl group; particularly when the shampoo formulation further comprises a sodium lauryl ether surfactant, wherein the sodium lauryl ether surfactant is selected from the group consisting of a sodium lauryl ether sulfate having an average of two —$(OCH_2CH_2)$— groups per molecule, a sodium lauryl ether sulfate having an average of three —$(OCH_2CH_2)$— groups per molecule and mixtures thereof.

Unless otherwise indicated, ratios, percentages, parts, and the like are by weight.

As used herein, unless otherwise indicated, the phrase "molecular weight" or Mw refers to the weight average molecular weight as measured in a conventional manner with gel permeation chromatography (GPC) and conventional standards, such as polyethylene glycol standards. GPC techniques are discussed in detail in Modern Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Molecular weights are reported herein in units of Daltons, or equivalently, g/mol.

The term "dermatologically acceptable" as used herein and in the appended refers to ingredients that are typically used for topical application to the skin, and is intended to underscore that materials that are toxic when present in the amounts typically found in skin care compositions are not contemplated as part of the present invention.

Preferably, the shampoo formulation of the present invention is selected from the group consisting of a shampoo and a conditioning shampoo.

Preferably, the shampoo formulation of the present invention, comprises: a dermatologically acceptable vehicle (preferably, wherein the shampoo formulation comprises 25 to 99.84 wt % (more preferably, 45 to 98.75 wt %; still more preferably, 79 to 97.1 wt %; most preferably, 84 to 94.4 wt %), based on weight of the shampoo formulation, of a dermatologically acceptable vehicle); a dermatologically acceptable silicone (preferably, wherein the shampoo formulation comprises 0.1 to 5 wt % (more preferably, 0.15 to 4 wt %; still more preferably, 0.25 to 2 wt %; most preferably, 0.4 to 1.5 wt %), based on weight of the shampoo formulation, of the dermatologically acceptable silicone); a sodium lauryl ether surfactant (preferably, 0.01 to 74.94 wt % (more preferably, 1 to 50 wt %; still more preferably, 2.5 to 20 wt %; most preferably, 5 to 15 wt %), based on weight of the shampoo formulation, of the sodium lauryl ether surfactant), wherein the sodium lauryl ether surfactant is selected from the group consisting of a sodium lauryl ether sulfate having an average of two —$(OCH_2CH_2)$— groups per molecule, a sodium lauryl ether sulfate having an average of three —$(OCH_2CH_2)$— groups per molecule and mixtures thereof (preferably, wherein the sodium lauryl ether surfactant includes a sodium lauryl ether surfactant having an average of three —$(OCH_2CH_2)$— groups per molecule; more preferably, wherein the sodium lauryl ether surfactant is a sodium lauryl ether surfactant having an average of three —$(OCH_2CH_2)$— groups per molecule); and a deposition aid polymer (preferably, 0.05 to 5 wt % (more preferably, 0.1 to 2 wt %; still more preferably, 0.15 to 1 wt %; most preferably, 0.2 to 0.5 wt %), based on weight of the shampoo formulation, of the deposition aid polymer), wherein the deposition aid polymer is a cationic dextran polymer, comprising a dextran polymer functionalized with quaternary ammonium groups; wherein the dextran polymer has a weight average molecular weight of 50,000 to 3,000,000 Daltons; wherein the quaternary ammonium groups are selected from the group consisting of quaternary ammonium moieties of formula (A) bound to a pendent oxygen on the dextran polymer

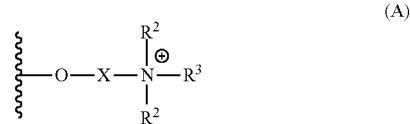

(A)

wherein

is a pendent oxygen on the dextran polymer; wherein X is a divalent linking group bonding the quaternary ammonium moiety to the pendent oxygen on the dextran polymer (preferably, wherein X is selected from divalent hydrocarbon groups, which may optionally be substituted (e.g., with a hydroxy group, an alkoxy group, an ether group); more preferably, wherein X is a —$CH_2CH(OR^4)CH_2$— group; wherein $R^4$ is selected from the group consisting of a hydrogen and a $C_{1-4}$ alkyl group (preferably, a hydrogen); most preferably, X is a —$CH_2CH(OH)CH_2$— group); wherein each $R^2$ is independently selected from the group consisting of a $C_{1-4}$ alkyl group (preferably, a $C_{1-3}$ alkyl group; more preferably, a $C_{1-2}$ alkyl group; most preferably, a methyl group); wherein $R^3$ is a linear or branched $C_{8-16}$ alkyl group (preferably, a linear or branched $C_8$ group; more preferably, a linear $C_8$ alkyl group) (preferably; wherein the deposition aid polymer enhances deposition of silicone from the shampoo formulation onto mammalian hair).

Preferably, the shampoo formulation of the present invention is a liquid formulation. More preferably, the shampoo formulation of the present invention is an aqueous liquid formulation.

Preferably, the shampoo formulation of the present invention, comprises: 25 to 99.84 wt % (preferably, 45 to 98.75 wt %; more preferably, 79 to 97.1 wt %; most preferably, 84 to 94.4 wt %), based on weight of the shampoo formulation, of a dermatologically acceptable vehicle. Still more preferably, the shampoo formulation of the present invention, comprises: 25 to 99.84 wt % (preferably, 45 to 98.75 wt %; more preferably, 79 to 97.1 wt %; most preferably, 84 to 94.4 wt %), based on weight of the shampoo formulation, of a dermatologically acceptable vehicle; wherein the dermatologically acceptable vehicle comprises water. Yet more preferably, the shampoo formulation of the present invention, comprises: 25 to 99.84 wt % (preferably, 45 to 98.75 wt %; more preferably, 79 to 97.1 wt %; most preferably, 84 to 94.4 wt %), based on weight of the shampoo formulation, of a dermatologically acceptable vehicle; wherein the dermatologically acceptable vehicle is selected from the group consisting of water and an aqueous $C_{1-4}$ alcohol mixture. Most preferably, the shampoo formulation of the present invention, comprises: 25 to 99.84 wt % (preferably, 45 to 98.75 wt %; more preferably, 79 to 97.1 wt %; most preferably, 84 to 94.4 wt %), based on weight of the shampoo formulation, of a dermatologically acceptable vehicle; wherein the dermatologically acceptable vehicle is water.

Preferably, the water used in the shampoo formulation of the present invention is at least one of distilled water and deionized water. More preferably, the water used in the shampoo formulation of the present invention is distilled and deionized.

Preferably, the shampoo formulation of the present invention comprises 0.1 to 5 wt % (preferably, 0.15 to 4 wt %; more preferably, 0.25 to 2 wt %; most preferably, 0.4 to 1.5 wt %), based on weight of the shampoo formulation, of a dermatologically acceptable silicone (preferably, wherein the dermatologically acceptable silicone conditions hair). More preferably, the shampoo formulation of the present invention comprises 0.1 to 5 wt % (preferably, 0.15 to 4 wt %; more preferably, 0.25 to 2 wt %; most preferably, 0.4 to 1.5 wt %), based on weight of the shampoo formulation, of a dermatologically acceptable silicone, wherein the dermatologically acceptable silicone is selected from the group consisting of amodimethicone, cyclomethicone, dimethicone, dimethiconol, hexadecyl methicone, hexamethyldisiloxane, methicone, phenyl dimethicone, stearoxy dimethicone polyalkyl siloxane, polyalkylaryl siloxane, silicone gums (i.e., polydiorganosiloxanes having a weight average molecular weight of 200,000 to 1,000,000 Daltons), polyaminofunctional silicones (e.g., Dow Corning® 929) and mixtures thereof. Yet more preferably, the shampoo formulation of the present invention comprises 0.1 to 5 wt % (preferably, 0.15 to 4 wt %; more preferably, 0.25 to 2 wt %; most preferably, 0.4 to 1.5 wt %), based on weight of the shampoo formulation, of a dermatologically acceptable silicone, wherein the dermatologically acceptable silicone is selected from the group consisting of amodimethicone, cyclomethicone, dimethicone, dimethiconol, hexadecyl methicone, hexamethyldisiloxane, methicone, phenyl dimethicone, stearoxy dimethicone and mixtures thereof. Still yet more preferably, the shampoo formulation of the present invention comprises 0.1 to 5 wt % (preferably, 0.15 to 4 wt %; more preferably, 0.25 to 2 wt %; most preferably, 0.4 to 1.5 wt %), based on weight of the shampoo formulation, of a dermatologically acceptable silicone, wherein the dermatologically acceptable silicone is selected from the group consisting of amodimethicone, cyclomethicone, dimethicone, dimethiconol, hexadecyl methicone, methicone and mixtures thereof. Still more preferably, the shampoo formulation of the present invention comprises 0.1 to 5 wt % (preferably, 0.15 to 4 wt %; more preferably, 0.25 to 2 wt %; most preferably, 0.4 to 1.5 wt %), based on weight of the shampoo formulation, of a dermatologically acceptable silicone, wherein the dermatologically acceptable silicone is selected from the group consisting of amodimethicone, dimethicone, dimethiconol and a mixture thereof. Most preferably, the shampoo formulation of the present invention comprises 0.1 to 5 wt % (preferably, 0.15 to 4 wt %; more preferably, 0.25 to 2 wt %; most preferably, 0.4 to 1.5 wt %), based on weight of the shampoo formulation, of a dermatologically acceptable silicone, wherein the dermatologically acceptable silicone comprises a dimethiconol.

Preferably, the shampoo formulation of the present invention comprises 0.01 to 74.94 wt % (preferably, 1 to 50 wt %; more preferably, 2.5 to 20 wt %; most preferably, 5 to 15 wt %), based on weight of the shampoo formulation, of a sodium lauryl ether surfactant; wherein the sodium lauryl ether surfactant is selected from the group consisting of a sodium lauryl ether sulfate having an average of two —$(OCH_2CH_2)$— groups per molecule, a sodium lauryl ether sulfate having an average of three —$(OCH_2CH_2)$— groups per molecule and mixtures thereof. More preferably, the shampoo formulation of the present invention comprises 0.01 to 74.94 wt % (preferably, 1 to 50 wt %; more preferably, 2.5 to 20 wt %; most preferably, 5 to 15 wt %), based on weight of the shampoo formulation, of a sodium lauryl ether surfactant; wherein the sodium lauryl ether surfactant includes a sodium lauryl ether sulfate having an average of three —$(OCH_2CH_2)$— groups per molecule. Most preferably, the shampoo formulation of the present invention comprises 0.01 to 74.94 wt % (preferably, 1 to 50 wt %; more preferably, 2.5 to 20 wt %; most preferably, 5 to 15 wt %), based on weight of the shampoo formulation, of a sodium lauryl ether surfactant; wherein the sodium lauryl ether surfactant is a sodium lauryl ether surfactant having an average of three —$(OCH_2CH_2)$— groups per molecule.

Preferably, the shampoo formulation of the present invention comprises 0.05 to 5 wt % (preferably, 0.1 to 2 wt %; more preferably, 0.15 to 1 wt %; most preferably, 0.2 to 0.5 wt %), based on weight of the shampoo formulation, of a deposition aid polymer, wherein the dextran polymer has a weight average molecular weight of 50,000 to 3,000,000 Daltons; wherein the quaternary ammonium groups are selected from the group consisting of quaternary ammonium moieties of formula (A) bound to a pendent oxygen on the dextran polymer

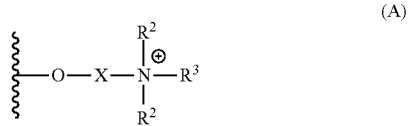

wherein

is a pendent oxygen on the dextran polymer; wherein X is a divalent linking group bonding the quaternary ammonium moiety to the pendent oxygen on the dextran polymer (preferably, wherein X is selected from divalent hydrocarbon groups, which may optionally be substituted (e.g., with a hydroxy group, an alkoxy group, an ether group); more preferably, wherein X is a $-CH_2CH(OR^4)CH_2-$ group; wherein $R^4$ is selected from the group consisting of a hydrogen and a $C_{1-4}$ alkyl group (preferably, a hydrogen); most preferably, X is a $-CH_2CH(OH)CH_2-$ group); wherein each $R^2$ is independently selected from the group consisting of a $C_{1-4}$ alkyl group (preferably, a $C_{1-3}$ alkyl group; more preferably, a $C_{1-2}$ alkyl group; most preferably, a methyl group); wherein $R^3$ is a linear or branched $C_{8-16}$ alkyl group (preferably, a linear or branched $C_8$ alkyl group; more preferably, a linear $C_8$ alkyl group) (preferably, wherein the deposition aid polymer enhances deposition of silicone from the shampoo formulation onto mammalian hair). More preferably, the shampoo formulation of the present invention comprises 0.05 to 5 wt % (preferably, 0.1 to 2 wt %; more preferably, 0.15 to 1 wt %; most preferably, 0.2 to 0.5 wt %), based on weight of the shampoo formulation, of a deposition aid polymer, wherein the dextran polymer has a weight average molecular weight of 50,000 to 3,000,000 Daltons; wherein the quaternary ammonium groups are selected from the group consisting of quaternary ammonium moieties of formula (B) bound to a pendent oxygen on the dextran polymer

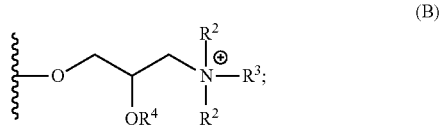

wherein

is a pendent oxygen on the dextran polymer; wherein each $R^2$ is independently selected from the group consisting of a $C_{1-4}$ alkyl group (preferably, a $C_{1-3}$ alkyl group; more preferably, a $C_{1-2}$ alkyl group; most preferably, a methyl group); wherein $R^3$ is a linear or branched $C_{8-16}$ alkyl group (preferably, a linear or branched $C_8$ alkyl group; more preferably, a linear $C_8$ alkyl group) (preferably, wherein the deposition aid polymer enhances deposition of silicone from the shampoo formulation onto mammalian hair); and wherein $R^4$ is selected from the group consisting of a hydrogen and a $C_{1-4}$ alkyl group (preferably, a hydrogen). Most preferably, the shampoo formulation of the present invention comprises 0.05 to 5 wt % (preferably, 0.1 to 2 wt %; more preferably, 0.15 to 1 wt %; most preferably, 0.2 to 0.5 wt %), based on weight of the shampoo formulation, of a deposition aid polymer, wherein the dextran polymer has a weight average molecular weight of 50,000 to 3,000,000 Daltons; wherein the quaternary ammonium groups are selected from the group consisting of quaternary ammonium moieties of formula (C) bound to a pendent oxygen on the dextran polymer

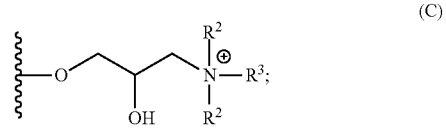

wherein

is a pendent oxygen on the dextran polymer; wherein each $R^2$ is a methyl group; wherein $R^3$ is a linear $C_8$ alkyl group and wherein the deposition aid polymer enhances deposition of silicone from the shampoo formulation onto mammalian hair (preferably, wherein the deposition aid polymer enhances deposition of silicone from the shampoo formulation onto mammalian hair).

Preferably, the deposition aid polymer has a Kjeldahl nitrogen content, TKN, of 0.5 to 4.0 wt % (preferably, 0.6 to 3.25 wt %; more preferably, 0.7 to 2.6 wt %; most preferably, 0.8 to 2.0 wt %) measured using a Buchi KjelMaster K-375 automated analyzer, corrected for volatiles and ash measured as described in ASTM method D-2364.

Preferably, the dextran polymer has a weight average molecular weight of 50,000 to 3,000,000 Daltons (preferably, 100,000 to 2,000,000 Daltons; more preferably, 125,000 to 1,000,000 Daltons; still more preferably, 130,000 to 650,000 Daltons; most preferably, 145,000 to 525,000 Daltons). More preferably, the dextran polymer has a weight average molecular weight of 50,000 to 3,000,000 Daltons (preferably, 100,000 to 2,000,000 Daltons; more preferably, 125,000 to 1,000,000 Daltons; still more preferably, 130,000 to 650,000 Daltons; most preferably, 145,000 to 525,000 Daltons); and the dextran polymer is a branched chain dextran polymer comprising a plurality of glucose structural units; wherein 90 to 98 mol % (preferably, 92.5 to 97.5 mol %; more preferably, 93 to 97 mol %; most preferably, 94 to 96 mol %) of the glucose structural units are connected by α-D-1,6 linkages and 2 to 10 mol % (preferably, 2.5 to 7.5 mol %; more preferably, 3 to 7 mol %; most preferably, 4 to 6 mol %) of the glucose structural units are connected by α-1,3 linkages. Most preferably, the dextran polymer has a weight average molecular weight of 50,000 to 3,000,000 Daltons (preferably, 100,000 to 2,000,000 Daltons; more preferably, 125,000 to 1,000,000 Daltons; still more preferably, 130,000 to 650,000 Daltons; most preferably, 145,000 to 525,000 Daltons); and the dextran polymer is a branched chain dextran polymer comprising a plurality of glucose structural units; wherein 90 to 98 mol % (preferably, 92.5 to 97.5 mol %; more preferably, 93 to 97 mol %; most preferably, 94 to 96 mol %) of the glucose structural units are connected by α-D-1,6 linkages and 2 to 10 mol % (preferably, 2.5 to 7.5 mol %; more preferably, 3 to 7 mol %; most preferably, 4 to 6 mol %) of the glucose structural units are connected by α-1,3 linkages according to formula I diols (e.g., propylene glycol), diol analogs, triols, triol analogs, cationic polymeric polyols); a wax; a foaming agent; an emulsifying agent; a colorant; a fragrance; a chelating agent (e.g., tetrasodium ethylene diamine tetraacetic acid); a preservative (e.g., benzoic acid, sorbic acid, phenoxyethanol, methylisothiazolinone); a bleaching agent; a lubricating agent; a sensory modifier; a sunscreen additive; a vitamin; a protein/amino acid; a plant extract; a natural

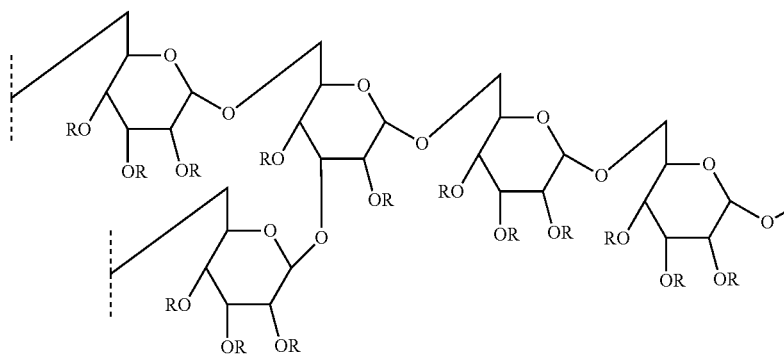

(I)

wherein R is selected from a hydrogen, a $C_{1-4}$ alkyl group and a hydroxy $C_{1-4}$ alkyl group; and wherein the average branch off the dextran polymer backbone is ≤3 anhydroglucose units.

Preferably, the dextran polymer contains less than 0.01 wt %, based on weight of the dextran polymer, of alternan. More preferably, the dextran polymer contains less than 0.001 wt %, based on weight of the dextran polymer, of alternan. Most preferably, the dextran polymer contains less than the detectable limit of alternan.

Preferably, the deposition aid polymer comprises <0.001 meq/gram (preferably, <0.0001 meq/gram; more preferably, <0.00001 meq/gram; most preferably, <detectable limit) of aldehyde functionality.

Preferably, the deposition aid polymer comprises <0.1% (preferably, <0.01%; more preferably, <0.001%; most preferably, <detectable limit), of the linkages between individual glucose units in the deposition aid polymer are β-1,4 linkages.

Preferably, the deposition aid polymer comprises <0.1% (preferably, <0.01%; more preferably, <0.001%; most preferably, <detectable limit), of the linkages between individual glucose units in the deposition aid polymer are β-1,3 linkages.

Preferably, the deposition aid polymer comprises <0.001 meq/gram (preferably, <0.0001 meq/gram; more preferably, <0.00001 meq/gram; most preferably, <detectable limit) of silicone containing functionality.

Preferably, the shampoo formulation of the present invention, optionally, further comprises at least one additional ingredient selected from the group consisting of an additional shampoo cleaning surfactant (e.g., cocamide monoethanolamine, cocamidopropyl betaine); an antimicrobial agent/preservative (e.g., benzoic acid, sorbic acid, phenoxyethanol, methylisothiazolinone); a rheology modifier (e.g., PEG-150 pentaerythrityl tetrastearate); a soap; a colorant; pH adjusting agent; an antioxidant (e.g., butylated hydroxytoluene); a humectant (e.g., glycerin, sorbitol, monoglycerides, lecithins, glycolipids, fatty alcohols, fatty acids, polysaccharides, sorbitan esters, polysorbates (e.g., Polysorbate 20, Polysorbate 40, Polysorbate 60, and Polysorbate 80), ingredient; a bioactive agent; an anti-aging agent; a pigment; an acid; a penetrant; an anti-static agent; an anti-frizz agent; an antidandruff agent; a hair waving/straightening agent; a hair styling agent; a hair oil; natural oils or ester emollients (e.g., mono-, di- and tri-glycerides such as sunflower seed oil, coconut oil, cottonseed oil, borage oil, borage seed oil, primrose oil, castor and hydrogenated castor oils, rice bran oil, soybean oil, olive oil, safflower oil, shea butter, jojoba oil and combinations thereof); an absorbent; a hard particle; a soft particle; a conditioning agent (e.g., guar hydroxypropyltrimonium chloride, PQ-10, PQ-7, PQ-67); a slip agent; an opacifier; a pearlizing agent and a salt. More preferably, the shampoo formulation of the present invention, optionally, further comprises at least one additional ingredient selected from the group consisting of an additional shampoo cleaning surfactant (e.g., cocamide monoethanolamine, cocamidopropyl betaine); an antimicrobial agent/preservative (e.g., benzoic acid, sorbic acid, phenoxyethanol, methylisothiazolinone); a rheology modifier (e.g., PEG-150 pentaerythrityl tetrastearate); and a chelating agent (e.g., tetrasodium ethylene diamine tetraacetic acid). Most preferably, the shampoo formulation of the present invention, optionally, further comprises at least one additional ingredient selected from the group consisting of an additional shampoo cleaning surfactant (e.g., cocamide monoethanolamine, cocamidopropyl betaine); an antimicrobial agent/preservative mixture of phenoxyethanol and methylisothiazolinone; PEG-150 pentaerythrityl tetrastearate; tetrasodium ethylene diamine tetraacetic acid and a mixture of phenoxyethanol and methylisothiazolinone.

Preferably, the shampoo formulation of the present invention further comprises an additional shampoo cleaning surfactant. More preferably, the shampoo formulation of the present invention further comprises an additional shampoo cleaning surfactant, wherein the additional shampoo cleaning surfactant is selected from the group consisting of alkyl polyglucosides (e.g., lauryl glucoside, coco-glucoside, decyl glucoside), glycinates (e.g., sodium cocoyl glycinate), betaines (e.g., alkyl betaines such as cetyl betaine and amido betaines such as cocamidopropyl betaine), taurates (e.g., sodium methyl cocoyl taurate), glutamates (e.g., sodium cocoyl glutamate), sarcosinates (e.g., sodium lauroyl sarcosinate), isethionates (e.g., sodium cocoyl isethionate, sodium lauroyl methyl isethionate), sulfoacetates (e.g., sodium lauryl sulfoacetate), alaninates (e.g., sodium cocoyl alaninate), amphoacetates (e.g., sodium cocoamphoacetate), sulfonates (e.g., sodium $C_{14-16}$ olefin sulfonate), succinates (e.g., disodium lauryl sulfosuccinate), fatty alkanolamides (e.g., cocamide monoethanolamine, cocamide diethanolamine, soyamide diethanolamine, lauramide diethanolamine, oleamide monoisopropanolamine, stearamide monoethanolamine, myristamide monoethanolamine, lauramide monoethanolamine, capramide diethanolamine, ricinoleamide diethanolamine, myristamide diethanolamine, stearamide diethanolamine, oleylamide diethanolamine, tallowamide diethanolamine, lauramide monoisopropanolamine, tallowamide monoethanolamine, isostearamide diethanolamine, isostearamide monoethanolamine) and mixtures thereof. Still more preferably, the shampoo formulation of the present invention further comprises an additional shampoo cleaning surfactant; wherein the additional shampoo cleaning surfactant is selected from the group consisting of alkyl polyglucosides (e.g., lauryl glucoside, coco-glucoside, decyl glucoside), glycinates (e.g., sodium cocoyl glycinate), betaines (e.g., alkyl betaines such as cetyl betaine and amido betaines such as cocamidopropyl betaine), taurates (e.g., sodium methyl cocoyl taurate), glutamates (e.g., sodium cocoyl glutamate), sarcosinates (e.g., sodium lauroyl sarcosinate), isethionates (e.g., sodium cocoyl isethionate, sodium lauroyl methyl isethionate), sulfoacetates (e.g., sodium lauryl sulfoacetate), alaninates (e.g., sodium cocoyl alaninate), amphoacetates (e.g., sodium cocoamphoacetate), sulfonates (e.g., sodium $C_{14-16}$ olefin sulfonate), succinates (e.g., disodium lauryl sulfosuccinate), fatty alkanolamides (e.g., cocamide monoethanolamine, cocamide diethanolamine, soyamide diethanolamine, lauramide diethanolamine, oleamide monoisopropanolamine, stearamide monoethanolamine, myristamide monoethanolamine, lauramide monoethanolamine, capramide diethanolamine, ricinoleamide diethanolamine, myristamide diethanolamine, stearamide diethanolamine, oleylamide diethanolamine, tallowamide diethanolamine, lauramide monoisopropanolamine, tallowamide monoethanolamine, isostearamide diethanolamine, isostearamide monoethanolamine) and mixtures thereof. Most preferably, the shampoo formulation of the present invention further comprises an additional shampoo cleaning surfactant; wherein the additional shampoo cleaning surfactant comprises a mixture of a betaine (preferably, cocamidopropyl betaine) and a fatty alkanolamide (preferably, cocamide monoethanolamine)

Preferably, the shampoo formulation of the present invention further comprises a thickener. More preferably, the shampoo formulation further comprises a thickener, wherein the thickener is selected to increase the viscosity of the shampoo formulation, preferably without substantially modifying the other properties of the shampoo formulation. Preferably, the shampoo formulation further comprises a thickener, wherein the thickener is selected to increase the viscosity of the shampoo formulation, preferably without substantially modifying the other properties of the shampoo formulation and wherein the thickener accounts for 0 to 5.0 wt % (preferably, 0.1 to 5.0 wt %; more preferably, 0.2 to 2.5 wt %; most preferably, 0.5 to 2.0 wt %), based on weight of the shampoo formulation.

Preferably, the shampoo formulation of the present invention further comprises an antimicrobial agent/preservative. More preferably, the shampoo formulation of the present invention further comprises an antimicrobial/preservative, wherein the antimicrobial/preservative is selected from the group consisting of phenoxyethanol, benzoic acid, benzyl alcohol, sodium benzoate, DMDM hydantoin, 2-ethylhexyl glyceryl ether, isothiazolinone (e.g., methylchloroisothiazolinone, methylisothiazolinone) and mixtures thereof. Still more preferably, the shampoo formulation of the present invention, further comprises an antimicrobial/preservative, wherein the antimicrobial/preservative is a mixture of phenoxyethanol and an isothiazolinone (more preferably, wherein the antimicrobial/preservative is a mixture of phenoxyethanol and methylisothiazolinone).

Preferably, the shampoo formulation of the present invention optionally further comprises a pH adjusting agent. More preferably, the shampoo formulation of the present invention, further comprises a pH adjusting agent, wherein the shampoo formulation has a pH of 4 to 9 (preferably, 4.25 to 8; more preferably, 4.5 to 7; most preferably, 4.75 to 6).

Preferably, the pH adjusting agent is selected from the group consisting of at least one of citric acid, lactic acid, hydrochloric acid, aminoethyl propanediol, triethanolamine, monoethanolamine, sodium hydroxide, potassium hydroxide, amino-2-methyl-1-propanol. More preferably, the pH adjusting agent is selected from the group consisting of at least one of citric acid, lactic acid, sodium hydroxide, potassium hydroxide, triethanolamine, amino-2-methyl-1-propanol. Still more preferably, the pH adjusting agent includes citric acid. Most preferably, the pH adjusting agent is citric acid.

Preferably, the method of depositing silicone on to mammalian hair of the present invention, comprises: selecting a shampoo formulation of the present invention and applying the shampoo formulation to mammalian hair. More preferably, the method of depositing silicone on to mammalian hair of the present invention, further comprises: rinsing the shampoo formulation from the mammalian hair with a rinse water. Most preferably, the method of depositing silicone on to mammalian hair of the present invention, comprises: selecting a shampoo formulation of the present invention; applying the shampoo formulation to mammalian hair; and rinsing the shampoo formulation from the mammalian hair; wherein the shampoo formulation is at least one of a shampoo and a conditioner (preferably, wherein the at least 10 mol % (more preferably, at least 12 mol %; most preferably, at least 15 mol %) of the silicone from the composition is deposited on the mammalian hair).

Some embodiments of the present invention will now be described in detail in the following Examples.

Synthesis S1: Synthesis of Cationic Dextran Polymer

A 500 mL, four necked, round bottom flask fitted with a rubber serum cap, a nitrogen inlet, a pressure equalizing addition funnel, a stirring paddle and motor, a subsurface thermocouple connected to a J-KEM controller and a Friedrich condenser connected to a mineral oil bubbler was charged with dextran polymer (125.97 g; 21.4% Polydex aqueous dextran), N,N-dimethyloctylamine (9.83 g) and epichlorohydrin (5.69 g). The contents of the flask were stirred at 70 rpm. While stirring, the head space in the flask was purged with a slow, steady flow of nitrogen (about one bubble per second) for one hour to remove any entrained oxygen in the apparatus.

After the one hour nitrogen purge, heat was applied to the flask contents using a heating mantle and the J-KEM controller (set-point of 70° C.). While stirring under nitrogen, the flask contents were maintained at 70° C. for 5 hours.

During this time, the color of the flask contents changed from yellow to dark brown, and the viscosity noticeably increased as the reaction progressed.

The flask contents were then cooled in a water bath while maintaining a positive nitrogen pressure in the flask. A solid polymer product was recovered from the flask contents by non-solvent precipitation with acetone. A Waring blender was charged with 500 mL of acetone and approximately 20 mL of polymer solution was slowly and continuously added at moderate mixing speed using a plastic disposable syringe. The polymer was recovered by vacuum filtration through a Buchner funnel with a fine frit. The Waring blender was charged with fresh acetone and the non-solvent precipitation of the remaining aqueous solution was continued. The polymer was briefly air dried, then dried overnight in vacuo at 50° C. The dried polymer was manually ground with a mortar and pestle, and screened through a US standard #30 sieve.

The product polymer was obtained as a white solid (29.63 g), with a volatiles content of 2.47%, and ash content (as sodium chloride) of 1.84%, and a Kjeldahl nitrogen content (corrected for ash and volatiles) of 1.442%, corresponding to a cationic substitution, CS, value of 0.225.

Synthesis S2: Synthesis of Cationic Dextran Polymer

A 500 mL, four necked, round bottom flask fitted with a rubber serum cap, a nitrogen inlet, a pressure equalizing addition funnel, a stirring paddle and motor, a subsurface thermocouple connected to a J-KEM controller and a Friedrich condenser connected to a mineral oil bubbler was charged with dextran polymer (126.92 g; 21.4% Polydex aqueous dextran), N,N-dimethyldodecylamine (13.54 g) and epichlorohydrin (5.84 g). The contents of the flask were stirred at 70 rpm. While stirring, the head space in the flask was purged with a slow, steady flow of nitrogen (about one bubble per second) for one hour to remove any entrained oxygen in the apparatus.

After the one hour nitrogen purge, heat was applied to the flask contents using a heating mantle and the J-KEM controller (set-point of 70° C.). While stirring under nitrogen, the flask contents were maintained at 70° C. for 5 hours. During this time, the color of the flask contents changed from yellow to dark brown, and the viscosity noticeably increased as the reaction progressed.

The flask contents were then cooled in a water bath while maintaining a positive nitrogen pressure in the flask. A solid polymer product was recovered from the flask contents by non-solvent precipitation with acetone. A Waring blender was charged with 500 mL of acetone and approximately 20 mL of polymer solution was slowly and continuously added at moderate mixing speed using a plastic disposable syringe. The polymer was recovered by vacuum filtration through a Buchner funnel with a fine frit. The Waring blender was charged with fresh acetone and the non-solvent precipitation of the remaining aqueous solution was continued. The polymer was briefly air dried, then dried overnight in vacuo at 50° C. The dried polymer was manually ground with a mortar and pestle, and screened through a US standard #30 sieve.

The product polymer was obtained as a white solid (29.96 g), with a volatiles content of 2.35%, and ash content (as sodium chloride) of 1.99%, and a Kjeldahl nitrogen content (corrected for ash and volatiles) of 1.079%, corresponding to a CS value of 0.163.

Comparative Examples CF1-CF6 and Examples F1-F2: Shampoo Formulations

A shampoo formulation was prepared in each of Comparative Examples CF1-CF4 and Examples F1-F2 having the formulation noted in TABLE 1. Specifically, the shampoo formulations were prepared in each of Comparative Examples CF1-CF6 and Examples F1-F2 using the following process: In a container, the 30 wt % aqueous solution of sodium lauryl sulfate was dissolved in 20 g of deionized water and heated to 70° C. with constant stirring. The polymer noted in TABLE 1 was then added to the container with stirring (e.g., guar hydroxypropyltrimonium chloride, inventive cationic dextran prepared according to Example S1 or comparative cationic dextran prepared according to Comparative Example S2). When the polymer was dissolved, the tetrasodium EDTA was then added to the container. Once the container contents reached 70° C., the 45 wt % aqueous solution a portion of the PEG-150 pentaerythrityl tetrastearate and the 30 wt % aqueous solution of cocamide MEA were added to the container. Then the 30 wt % solution of cocamidopropyl betaine was added to the container. The contents of the container were then allowed to cool. Once at room temperature, the phenoxyethanol and methylisothiazolinone preservative and the 50 wt % solids aqueous emulsion of dimethiconol and TEA-dodecylbenzenesulfonate were added to the container. The final pH of the product shampoo formulation was then adjusted to a pH of 5 using sodium hydroxide or citric acid as necessary and sufficient water was added to adjust the total formulation weight to 100 g. Additional PEG-150 pentaerythrityl tetrastearate was added to adjust the final formulation viscosity to 11,000 cP Brookfield viscosity measured using a number 6 spindle at 30 rpm under laboratory conditions.

TABLE 1

| Ingredient INCI name | CF1 | CF2 | CF3 | CF4 | CF5 | CF6 | F1 | F2 |
|---|---|---|---|---|---|---|---|---|
| | | | | wt % active | | | | |
| Deionized water | | | | q.s. 100 | | | | |
| Sodium lauryl ether sulfate[1] | 9 | 9 | 9 | 0 | 0 | 0 | 0 | 0 |
| Sodium lauryl ether sulfate[2] | 0 | 0 | 0 | 9 | 0 | 0 | 9 | 0 |
| Sodium lauryl ether sulfate[3] | 0 | 0 | 0 | 0 | 9 | 9 | 0 | 9 |
| Guar hydroxypropyltrimonium chloride[4] | 0.3 | 0 | 0 | 0.3 | 0.3 | 0 | 0 | 0 |
| Polymer from Synthesis S1 | 0 | 0.3 | 0 | 0 | 0 | 0 | 0.3 | 0.3 |
| Polymer from Synthesis S2 | 0 | 0 | 0.3 | 0 | 0 | 0.3 | 0 | 0 |
| Tetrasodium EDTA[5] | 0.2 | 0.2 | 0.2 | 0.2 | 0.2 | 0.2 | 0.2 | 0.2 |
| Sodium chloride | 0 | 0 | 0 | 0 | 0 | 0 | 0 | 0 |
| Cocamide MEA[6] | 1.0 | 1.0 | 1.0 | 10 | 1.0 | 1.0 | 1.0 | 1.0 |

TABLE 1-continued

| Ingredient INCI name | CF1 | CF2 | CF3 | CF4 wt % active | CF5 | CF6 | F1 | F2 |
|---|---|---|---|---|---|---|---|---|
| Cocamidopropyl Betaine[7] | 2.1 | 2.1 | 2.1 | 2.1 | 2.1 | 2.1 | 2.1 | 2.1 |
| Phenoxyethanol and Methylisothiazolinone[8] | 0.25 | 0.25 | 0.25 | 0.25 | 0.25 | 0.25 | 0.25 | 0.25 |
| Dimethiconol and TEA-dodecylbenzenesulfonate[9] | 1.0 | 1.0 | 1.0 | 1.0 | 1.0 | 1.0 | 1.0 | 1.0 |
| PEG-150 Pentaerythrityl Tetrastearate[10] | | | | q.s. viscosity 11,000 cP | | | | |
| Sodium hydroxide or Citric acid | | | | q.s. pH 5 | | | | |

[1] available from Stepan Company under tradename Steol ® CS-130
[2] available from Stepan Company under tradename Steol ® CS-230
[3] available from Stepan Company under tradename Steol ® CS-330
[4] available from Solvay Novecare under tradename Jaguar Excel
[5] available from The Dow Chemical Company under tradename Versene™ 220
[6] available from Croda Inc. under tradename Incromide™ CMEA
[7] available from Stepan Company under tradename Amphosol ® CA
[8] preservative available from The Dow Chemical Company under tradename Neolone™ PE
[9] available from The Dow Chemical Company under tradename Dowsil™ 1785 emulsion
[10] available from Croda Inc. under tradename Crothix™-PA-(MH)

Silicone Deposition Analysis

The silicone deposition on hair from the shampoo formulations prepared according to Comparative Examples CF1-CF6 and Example F1-F2 was quantified using X-ray photoelectron spectroscopy (XPS), which gives a quantitative elemental and chemical state information from the top 10 nm of the hair sample.

Hair tresses (2 g, European Virgin Brown available from International Hair Importers) were initially washed in a 9 wt % sodium lauryl sulfate solution and rinsed with water flowing at 0.4 L/min for 30 seconds. Following the initial wash step, the hair tresses were then washed with a shampoo formulation of Comparative Examples CF1-CF6 and Example F1-F2 by applying 0.8 g of the shampoo formulation to the hair tress and massaging in for 30 seconds on each side and then rinsing with water flowing at 0.4 L/min for 15 seconds on each side. The hair tresses were then evaluated using XPS. The XPS data were acquired from four areas per tress across a 1 cm² by 3 mm hair bundle. The instrument parameters used are provided in TABLE 2. The mol % of the silicon from the shampoo formulation deposited on the hair is reported in TABLE 3.

TABLE 2

| Instrument | K-Alpha X-ray photoelectron spectroscopy (XPS) |
|---|---|
| X-ray source: | Monochromatic Aluminum K-alpha |
| Analyzer Pass | 200 eV (survey spectra) |
| Energy | 20 eV (high resolution spectra) |
| Take-Off Angle | 90° |
| Auto height | on |
| Analysis Area | 400 μm oval |
| Flood Gun | on |
| Analysis Software | Casa 2.3.17 Dev. 6 3y |

TABLE 3

| Shampoo Formulation | Si deposition (mol %) |
|---|---|
| Comparative Example CF1 | 5.7 |
| Comparative Example CF2 | 2.9 |
| Comparative Example CF3 | 2.2 |
| Comparative Example CF4 | 4.5 |
| Comparative Example CF5 | 2.5 |
| Comparative Example CF6 | 2.6 |
| Example F1 | 10.8 |
| Example F2 | 15.9 |

We claim:

1. A shampoo formulation, comprising:
   a dermatologically acceptable vehicle;
   a dermatologically acceptable silicone;
   a sodium lauryl ether surfactant, wherein the sodium lauryl ether surfactant is selected from the group consisting of a sodium lauryl ether sulfate having an average of two —($OCH_2CH_2$)— groups per molecule, a sodium lauryl ether sulfate having an average of three —($OCH_2CH_2$)— groups per molecule and mixtures thereof;
   a deposition aid polymer, wherein the deposition aid polymer is a cationic dextran polymer, comprising a dextran polymer functionalized with quaternary ammonium groups; wherein the dextran polymer has a weight average molecular weight of 50,000 to 3,000,000 Daltons; wherein the quaternary ammonium groups are selected from the group consisting of quaternary ammonium moieties of formula (A) bound to a pendent oxygen on the dextran polymer

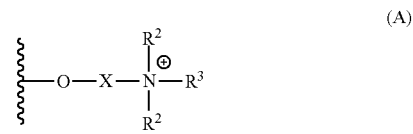

(A)

wherein

is a pendent oxygen on the dextran polymer; wherein X is a divalent linking group bonding the quaternary ammonium moiety to the pendent oxygen on the dextran polymer; wherein each $R^2$ is independently selected from the group consisting of a $C_{1-4}$ alkyl group; and wherein $R^3$ is a linear or branched $C_{8-16}$ alkyl group.

2. The shampoo formulation of claim 1, wherein the shampoo formulation is selected from the group consisting of a shampoo and a conditioning shampoo.

3. The shampoo formulation of claim 2, wherein the cationic dextran polymer has a Kjeldahl nitrogen content corrected for ash and volatiles, TKN, of 0.5 to 4.0 wt %.

4. The shampoo formulation of claim 3, wherein each $R^2$ is a methyl group and $R^3$ is a linear $C_8$ alkyl group.

5. The shampoo formulation of claim 4, further comprising a chelating agent and a thickener.

6. The shampoo formulation of claim 5, further comprising an additional shampoo cleaning surfactant selected from the group consisting of cocamide monoethanolamine, cocamidopropyl betaine and mixtures thereof.

7. The shampoo formulation of claim 6, wherein the chelating agent comprises tetrasodium ethylenediaminetetraacetic acid; and wherein the thickener comprises PEG-150 pentaerythrityl tetrastearate.

8. The shampoo formulation of claim 7, further comprising a preservative.

9. The shampoo formulation of claim 8, wherein the sodium lauryl ether surfactant includes a sodium lauryl ether surfactant having an average of three —(OCH$_2$CH$_2$)— groups per molecule.

10. A method of depositing silicone on to mammalian hair, comprising:
   selecting a shampoo formulation according to claim 1;
   applying the shampoo formulation to mammalian hair.

\* \* \* \* \*